United States Patent [19]
Freischlad

[11] Patent Number: 6,061,133
[45] Date of Patent: May 9, 2000

[54] INTERFEROMETER LIGHT SOURCE

[75] Inventor: Klaus Freischlad, Tucson, Ariz.

[73] Assignee: Phase Shift Technology, Tucson, Ariz.

[21] Appl. No.: 09/237,776

[22] Filed: Jan. 26, 1999

[51] Int. Cl.$^7$ ........................................... G01B 9/02
[52] U.S. Cl. ............................. 356/345; 356/353
[58] Field of Search ........................... 356/345, 346, 356/354, 353

[56] References Cited

U.S. PATENT DOCUMENTS

| | | |
|---|---|---|
| 4,201,473 | 5/1980 | Domenicali . |
| 4,869,593 | 9/1989 | Biegen . |
| 5,357,341 | 10/1994 | Kuchel . |
| 5,737,081 | 4/1998 | Freischlad . |

OTHER PUBLICATIONS

Fourier Description of Digital Phase Measuring Interferometry—Freischlad & Kolopoulos, U. of A., Nov. 18, 1989.

Speckle Removal by . . . , Lowenthal & Joyeaux, Journal of the Optical Society of America, vol. 61, No. 7 Jul. 1971.

*Primary Examiner*—Robert H. Kim
*Attorney, Agent, or Firm*—LaValle D. Ptak

[57] ABSTRACT

A low coherent noise interferometer system incorporates an improved low spatial coherence source obtained from a laser light source which supplies a beam of light through a beam-shaping lens to the first one of a set of two cascaded diffusers. One of the diffusers is dynamically changing, provided by a rotating ground glass disk. The diffusers then supply light to an interferometer of a two-beam interferometer configuration, such as Fizeau, Twyman-Green or Mach-Zehnder. In one embodiment, the first diffuser is the rotating ground glass diffuser and the second diffuser is a multi-mode optical fiber. The exit face of the fiber represents the spatially incoherent extended light source for the interferometer. The laser, the motor for driving the first diffuser and the diffusers themselves all are mounted on a separate base from the base on which the interferometer is mounted.

35 Claims, 2 Drawing Sheets

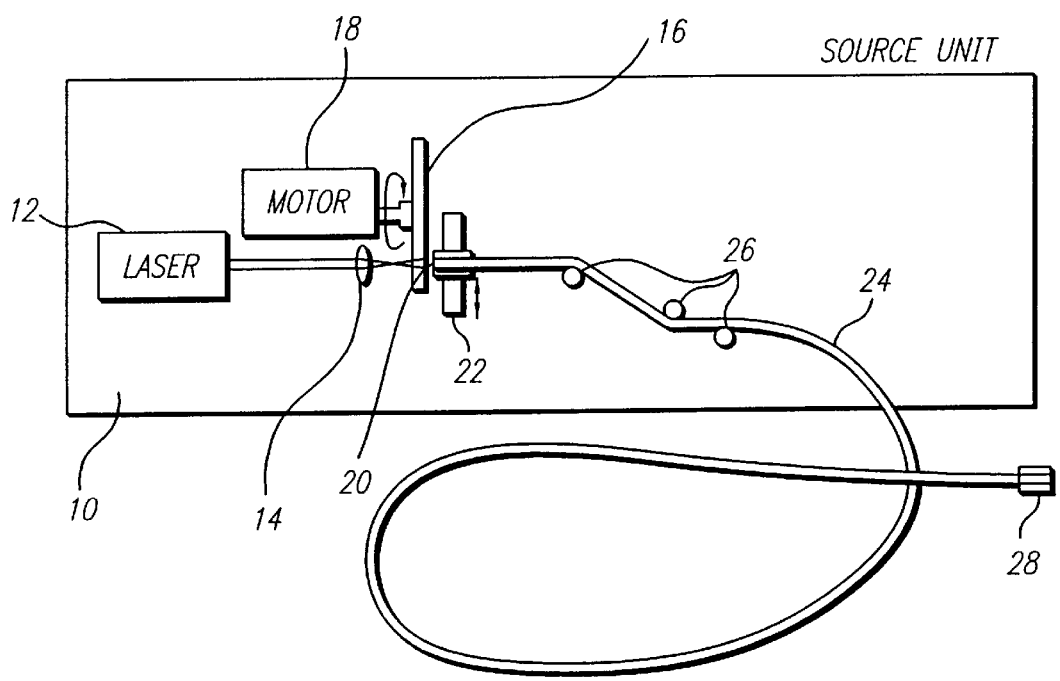
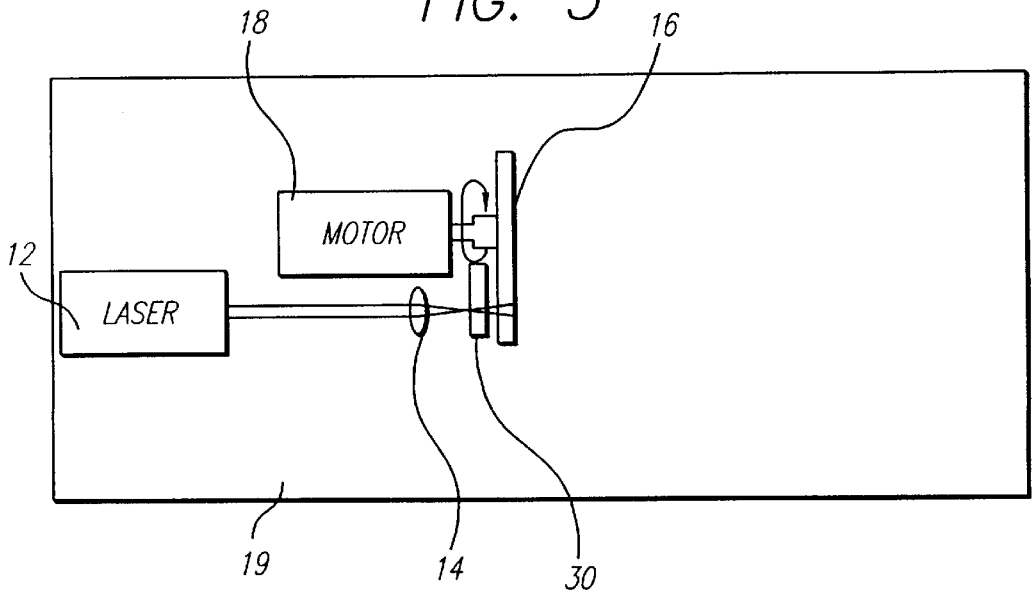

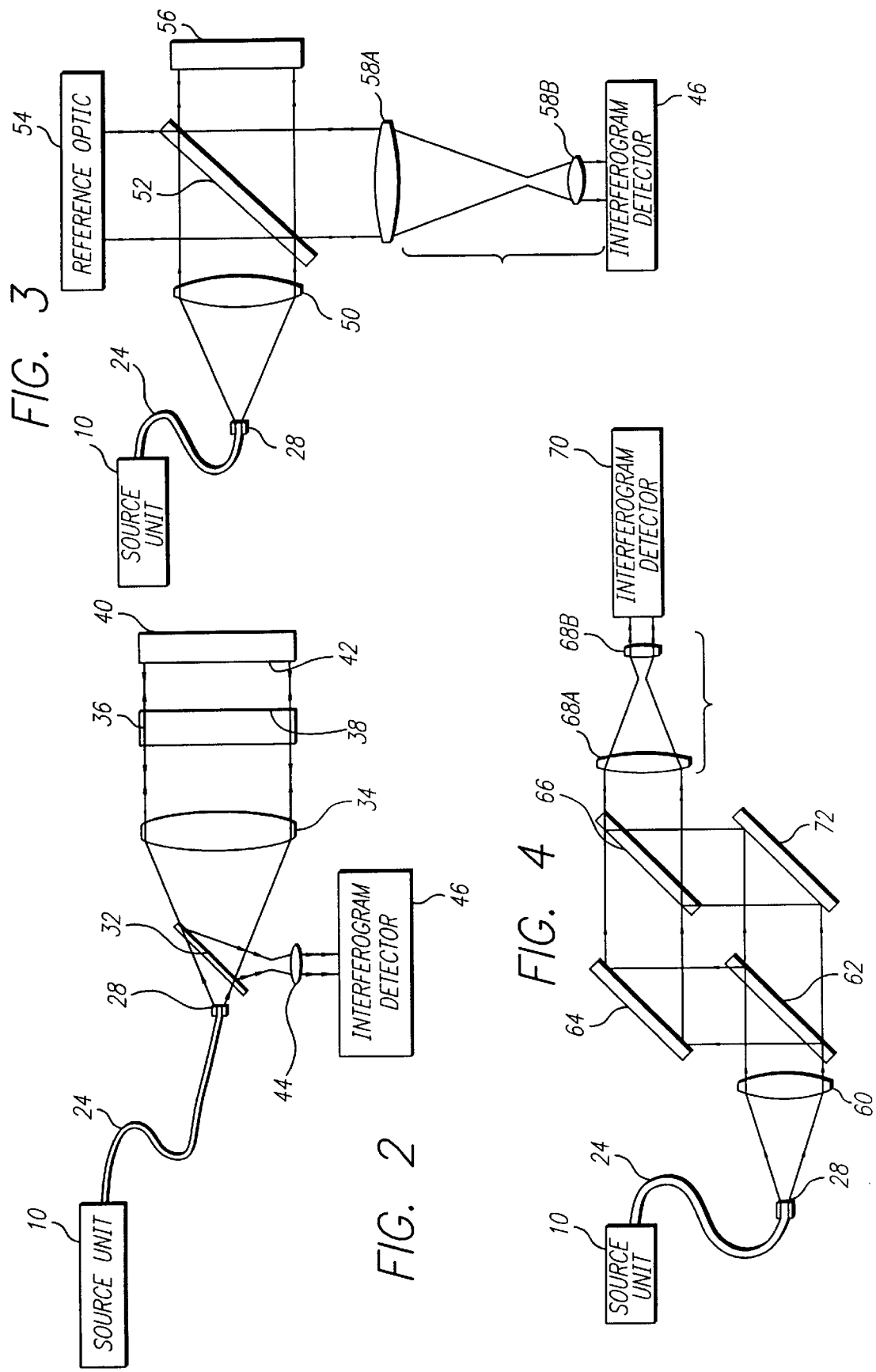

INTERFEROMETER LIGHT SOURCE

BACKGROUND

In optical metrology, interferometers are used for the measurement of the topography of test piece surfaces, and also of the wavefront quality of optical systems or material samples in transmission. The interferometers are typically, but not exclusively, of the Fizeau type, Twyman-Green type, or Mach-Zehnder type or variants thereof. They consist in general of a light source which provides a beam of light, some means to expand the beam to the required measurement diameter, a beam splitter to split the beam into a test beam and a reference beam, a means to recombine the test and reference beams, and, finally, an optical system to relay both beams to a detector sensing the interferogram. Depending upon the measurement requirements at hand, the suitable interferometer configuration is chosen.

The interferogram contains the information about the piece under test encoded in the phase of the interference fringes. The interferogram can be displayed for visual observation, either directly on a screen or on a video monitor. The interferogram also can be numerically analyzed in a computer. For such a numerical analysis, the detector typically consists of a video camera with a digitized output signal. Special phase detection algorithms exist which allow determining the phase of the interferogram with a very high degree of accuracy. Such algorithms are described in the article by Klaus Freischlad and Chris Koliopoulos entitled *Fourier Description of Digital Phase-Measuring Interferometry*, J. Opt. Soc. AM., Volume 7, Pages 542–551, April, 1990. These algorithms necessitate that the fringe phase is changed during the data acquisition, most often implemented by moving the reference optic with a PZT actuator.

Typically, lasers are used as the light sources for the interferometer. Because of the narrow spectral bandwidth, with the corresponding high degree of temporal coherence of the lasers used, the optical path difference between the test beam and the reference beam of the interferometer does not need to be matched; and the usage of the interferometer becomes simple. Typical laser sources, however, also have a high degree of spatial coherence, that is they essentially act as a point source for the interferometer. This high degree of spatial coherence again simplifies the interferometer usage, but also results in a loss of measurement accuracy due to coherent noise.

The coherent noise results from light scattered at microscopic imperfections and contaminations of the interferometer optics as the interferometer beam passes from the light source through the illuminating optics to the test piece and reference optics, and subsequently, through the imaging optics of the interferometer to the detector. At the detector of the interferometer, where the interference fringe pattern (interferogram) is formed, there are not only the unscattered reference beam and test beam, but also one or more spurious scattered beams. With a point source, these spurious beams create a so-called speckle pattern on the detector. Also, because of the point-like nature of the light source, the spurious beams change the phase distribution of the detected interferogram, from which the topography of the surface or wavefront under test is to be determined. To a fine degree, a smooth test surface thus does not lead to a smooth measurement, but rather to a rough and noisy topography measurement. This erroneous measurement component is called coherent noise.

The light scattering at the optical surfaces of the interferometer cannot be completely avoided, since in practical instruments all optical surfaces have a finite surface roughness. Also, dust and other contaminations contribute to light scattering. Consequently, in practice, the measurement accuracy of a surface is limited to about five to ten nanometers (nm) for high quality interferometers using fully coherent laser light from the source to the detector.

Various techniques have been employed to improve the measurement accuracy of interferometers by reducing coherent noise. Less susceptibility to coherent noise also allows for less stringent requirements for the surface quality of the interferometer optics. Different ones of the prior art techniques for providing this improvement of measurement accuracy are described in the following paragraphs.

The U.S. Pat. No. 4,201,473 to Domenicali discloses an interferometer using a laser point source which employs a rotating ground glass in an intermediate image plane of the interferogram. The intermediate image then is relayed to the detector. The rotating ground glass acts, to a large extent, as a spatially incoherent object for the subsequent imaging relay. As a result, the contribution to the coherent noise by the imaging relay is much reduced. The illumination optics and imaging optics, however, before the ground glass, still create coherent noise which appears in the interferogram. In addition, the rotating ground glass also can lead to streak-like artifacts in the measurement. One way of reducing the residual coherent noise from the illuminating optical system, as well as the artifacts from the rotating ground glass, consists of de-focusing the image of the ground glass onto the detector. This, however, also causes the image of the test-piece to be blurred; and fine test piece detail at high spatial frequencies is lost.

In the U.S. Pat. No. 5,357,341 to Kuchel the angle of the illuminating light from the interferometer is varied while measurements are acquired and averaged. In the device of the Kuchel patent, because of the different angles of illumination, the coherent noise pattern in each individual map is superposed at different positions on the surface or wavefront map; and the averaging process leads to a reduction of the coherent noise at high spatial frequencies. Since the test piece is imaged onto the detector, its image position is fixed; and the averaging does not lead to a loss of resolution of fine detail on the surface or wavefront under test. Alternatively, the test object is moved with respect to the interferometer optics; and individual measurements at different test piece positions are averaged. For the average, the individual surface or wavefront maps are superposed in such a way that the test piece motion is eliminated. Thus, the coherent noise is displaced in each map while the test piece is stationary. In the average of the individual maps, the coherent noise is reduced while the test piece topography is obtained without loss of resolution. A disadvantage of this technique, however, is that it requires the averaging of a very large number of individual maps. This often is not feasible because of the long data acquisition times required to do this.

In another technique, a low pass filtering data processing step in a computer is applied to the measured surfaces or wavefront topography map. Thus, the coherent noise at high spatial frequencies is reduced. The high spatial frequency content of the actual surface or wavefront under test, however, also is reduced; and fine surface or wavefront detail is suppressed.

In the U.S. Pat. No. 5,737,081, to Freischlad a device is disclosed in which an extended spatially incoherent source is used in a non-telecentric equal path Mach-Zehnder configuration. The large source extent makes any scattered light incoherent to the test and reference beams. As a result, no speckle pattern is present at the detector; and measurements with exceptionally low coherent noise can be made. The non-telecentric Mach-Zehnder configuration with the extended source, however, is suitable only for testing flat surfaces. Consequently, the device of this patent is not a general purpose interferometer configuration for optical testing.

In the devices disclosed in the U.S. Pat. Nos. 4,732,483; 4,869,593 and 4,948,253, to Biegen a technique is used in which a laser beam illuminates a rotating ground glass to cause an extended spot to appear on the ground glass surface. This extended spot on the rotating ground glass then constitutes the effective light source for the interferometer. Because of the extended source, the spurious scattered light has a low degree of coherence with the test and reference beams. Consequently, the speckles due to the spurious scattered light are very much reduced; and also, the coherent noise on the measured surface or wavefront topography is reduced. The combination of the laser with the rotating ground glass allows for an extended monochromatic source with a high degree of temporal coherence and a low degree of spatial coherence. Such a light source reduces the coherent noise while not requiring an equal path interferometer configuration with matched optical paths for the test beam and reference beam. This device can be employed in a variety of interferometer configurations for general optical testing. A disadvantage, however, is in the appearance of streak-like artifacts from the rotating ground glass which are still superposed on the topography measurement due to the limitation of rotation speed of the ground glass. In addition, the rotating ground glass in the interferometer often leads to vibrations of the test set up, resulting in reduced measurement accuracy. This is true even if the motor for rotating the ground glass disk is a precision motor, since any vibrations produced by the motor and the rotating disk are transferred to the frame or base on which the interferometer light source and motor are mounted.

It is desirable to provide an interferometer system for optical testing which has high spatial resolution and improved measurement accuracy, especially at higher spatial frequencies, and which overcomes the disadvantages of the prior art devices mentioned above.

SUMMARY OF THE INVENTION

It is an object of this invention to provide an improved spatially incoherent light source for use with an interferometer.

It is an additional object of this invention to provide an improved laser light source for use with interferometers where coherent noise is suppressed without loss of spatial resolution.

It is another object of this invention to provide an improved laser light source for interferometers employing cascaded diffusers to reduce coherent noise and streak-like artifacts on the surface or wavefront measurements.

It is a further object of this invention to provide an improved extended spatially incoherent laser light source for use with an interferometer employing a laser light source producing a beam of light transmitted through first and second cascaded diffusers mounted to receive the beam of light, and wherein one of the diffusers is a dynamically changing diffuser.

In accordance with a preferred embodiment of the invention, an extended spatially incoherent light source for use with an interferometer comprises a laser light source producing a beam of light. The beam of light from the laser light source is transmitted through first and second cascaded diffusers mounted in close proximity to the light source and to one another. The beam of light from the light source passes through the diffusers, one of which is a dynamically changing diffuser.

In a more specific embodiment of the invention, the first diffuser is a rotating ground glass diffuser; and the second diffuser consists of a multi-mode optical fiber. The entrance surface of the fiber is placed close to the first diffuser; and the exit face of the fiber comprises the spatially incoherent extended source of light for the interferometer.

BRIEF DESCRIPTION OF THE DRAWINGS

FIG. 1 is diagrammatic representation of a light source of a preferred embodiment of the invention;

FIG. 2 is a diagrammatic representation of a Fizeau interferometer with the light source of FIG. 1;

FIG. 3 is diagrammatic representation of a Twyman-Green interferomete with the light source of FIG. 1;

FIG. 4 is a diagrammatic representation of a Mach-Zehnder interferometer with the light source of FIG. 1; and FIG. 5 is a diagrammatic representation of an alternative light source which may be used in conjunction with the interferometers shown in FIGS. 2, 3 and 4.

DETAILED DESCRIPTION

Reference now should be made to the drawings, in which the same reference numbers are used throughout the different figures to designate the same components. FIG. 1 is a diagrammatic representation of an improved laser light source assembly in accordance with a preferred embodiment of the invention. This light source is mounted on a frame or housing 10, which typically is a separate housing or frame from the base or frame on which the interferometer with which the light source of FIG. 1 is used is mounted. The light beam from a laser 12 is projected onto a beam shaping lens 14. The lens 14 is used to create a spot of light on the diffuse surface of a rotating ground glass disk 16, which is rotated by means of a small electric motor 18. The spot of light created by the lens 14 on the rotating disk 16 is selected to be comparable to the core diameter of the input end 20 of a multi-mode optical fiber 24. At the same time, the lens 14 serves to match the angular spectrum of the light scattered by the rotating diffuser disk 16 to the angular acceptance range of the fiber 24.

Typically, the ground glass disk consists of a circular glass substrate 16 with one diffuse surface. The disk 16 is oriented so that the diffuse side is facing away from the beam-shaping lens 14. During operation, the motor 18 rotates the disk 16 to create a dynamically changing diffuser. Other diffuser types, such as liquid crystal diffusers, also could be used instead or rotating ground glass. The rotating ground glass disk 16, however, is convenient, relatively inexpensive, and simple to operate and implement. The end face 20 on the input side of the multi-mode fiber 24 is placed in close proximity to the diffuser disk 16; so that a fraction of the scattered light is coupled into the fiber 24. Potentially, other non-imaging light guides with a random mode structure, such as light pipes, could be used instead of the optical multi-mode fiber 24.

The input end 20 of the optical multi-mode fiber 24 is mounted on an adjustable stage 22, which can be moved in the direction of the arrows shown in FIG. 1 in a plane parallel to the surface of the ground glass disk 16. As a result, the amount of light which is coupled into the input end 20 of the fiber 24 depends on the degree of overlap between the spot of light focused through the diffuser disk 16 by the lens 14 and the fiber core at the input end surface 20. The result is that the positioning mechanism 22, which may be operated in any suitable conventional manner, represents a continuously variable attenuator, with which the brightness of the light source produced by the laser 12 can be adjusted for optimum exposure of the interferogram detector by adjusting the position of the input end 20 of the fiber 24.

A mode scrambling unit in the form of guide posts 26 is placed along the length of the fiber 24 on the base or frame 10. This mode scrambling unit 26 introduces one or more fiber bends with a short radius of curvature, essentially causing the fiber 24 to be configured into a serpentine path. Because of this bending, the light propagating in the different modes of the multi-mode fiber 24 is redistributed among the fiber modes. As a result, the light output at the output end 28 of the fiber is homogenized and more uniform. The light passing through the fiber 24 is transferred by the fiber to its output face at 28, as shown in FIG. 1.

The output face 28 functions as the effective source for coupling with an interferometer, where the source size corresponds to the core diameter of the fiber 24. Typically, the fiber core diameter is in the range of from 0.5 mm to 1.00 mm. The fiber end face at 28 is angled with respect to the fiber axis, such that light reflected by the subsequent interferometer back to the fiber is not reflected back into the interferometer where it could cause measurement errors.

It should be noted that the multi-mode fiber 24 comprises a second diffuser; so that the light from the laser 12 passes through two diffusers, namely the dynamically changing rotating ground glass disk diffuser 16 and the diffuser consisting of the multi-mode fiber section 24. The dynamically changing diffuser, in combination with the integration time of an interferogram detector of an interferometer employing the device of FIG. 1 as a light source, produces an effectively spatially incoherent extended source of light. In addition, the two diffuser arrangement significantly reduces coherent noise as well as streak-like artifacts on the surface or wavefront measurements.

The device of FIG. 1 ideally is used as a light source for a variety of different interferometers. FIGS. 2, 3 and 4 illustrate the source unit 10 of FIG. 1 employed with interferometers of different types, each of which are mounted on different frames or bases which are separate from the base or frame 10 on which the light source and diffusers; described above in conjunction with FIG. 1, are mounted. The multi-mode fiber 24 is used as the link between the spatially incoherent light source and the light input of the interferometer. This allows the laser source assembly shown in FIG. 1 to be located at a distance from the interferometer instrument. As a consequence, vibrations which are produced by the rotation of the ground glass disk 16 and the motor 18 are removed from the interferometer measurements, as well as any effects of heat produced by the laser, since a distance of several feet can be placed between the light source assembly of FIG. 1 and the different interferometer assemblies which are shown operating in conjunction with that light source unit in FIGS. 2, 3 and 4.

In FIG. 2, the light source assembly of FIG. 1 is illustrated as used for the effective light source for a Fizeau interferometer. The source unit 10 of FIG. 1 is employed; and the multi-mode fiber 24 is used to transmit the light from the laser 12 of FIG. 1 to the end face 28, which is attached to the Fizeau interferometer mounted on a separate frame, as illustrated in FIG. 2. The interferometer of FIG. 2 employs the light source 28 to project the light onto a first beam splitter 32, from which the light beam propagates to a collimating lens 34. A reference flat 36 is placed after the collimating lens 34; and part of the illuminating beam is reflected at the last surface 38 of the reference flat 36 into the interferometer as a reference beam. The portion of the beam transmitted by the beam splitter constitutes the test beam, which interacts with a test piece 40 having a test surface 42, which returns the test beam to the beam splitter where it is recombined with the reference beam. When testing the topography of a surface, the test surface 42 reflects the test beam back into the interferometer. When testing the wavefront quality of optical components or systems in transmission, the test beam passes through the test piece 42 and is reflected by an auxiliary mirror (not shown) back through the test piece into the interferometer. The reflected reference beam and the test beam pass again through the collimator lens 34 and are directed now by the beam splitter 32 to an imaging optic 44. The imaging optic images the optic under test onto an interferogram detector 46, which usually is a video camera. At the detector 46, an interferogram appears as the result of the interference of the test beam and the reference beam.

FIG. 3 illustrates another interferometer configuration using the source unit 10 to illuminate a Twyman-Green interferometer through the multi-mode fiber 24 producing the light source at the output end 28 of the fiber. The light beam exiting from the fiber end face 28 is collimated by a lens 50 in the interferometer shown in FIG. 3. The light beam then propagates to a beam splitter 52, which is placed at an angle to the illuminating beam. The reference beam is directed toward a separate reference surface 54, where it is reflected back to the beam splitter. The test beam is directed to a test piece 56 where it is reflected back to the beam splitter 52, where both beams are recombined. When testing the topography of a surface, the test surface 56 reflects the test beam back to the beam splitter 52. When the testing the wavefront quality of optical components or systems in transmission, the test beam passes through the piece under test 56, and is reflected by an auxiliary mirror (not shown) back through the test piece 56 to the beam splitter 52. This operation is conventional with a Twyman-Green interferometer. The beam splitter 52 then directs the returning test beam and the reference beam to a relay optical system 58A and 58B. The relay optical system images the optic under test onto an interferogram detector 46, as described previously in conjunction with FIG. 2. An interferogram appears as a result of the interference of the test beam and reference beam in the conventional manner of operation of a Twyman-Green interferometer.

FIG. 4 illustrates yet another interferometer configuration employing the extended spatially incoherent light source of FIG. 1. The configuration of FIG. 4 comprises a Mach-Zehnder interferometer which, as previously mentioned in conjunction with FIGS. 2 and 3, is mounted on a separate platform or frame apart from the platform or frame 10 on which the light source and diffusers of FIG. 1 are mounted. The light beam exiting from the fiber end face 28 of the multi-mode optical fiber 24 is collimated by a collimating lens 60. The beam then propagates from the lens 60 to a first beam splitter 62, which is placed at an angle to the illuminating beam. The reference beam then is directed to a first reflecting surface 64, which reflects the beam to a second beam splitter 66. The test beam is directed from the beam splitter 66 to a test surface 72, which also reflects the beam to the second beam splitter 66, where both beams are recombined. When this interferometer is used to test the topography of a surface, the test surface comprises the reflective surface 72. When the interferometer of FIG. 4 is used to test the wavefront quality of optical components or systems in transmission, the test piece is placed in the test beam between the two beam splitters 62 and 66. Thus, the test beam then passes through the piece under test only once before it is recombined with the reference beam at the second beam splitter. The second beam splitter 66 directs the test beam and the reference beam to a relay optic system 68A, 68B. This relay optic then images the optic under test onto an interferogram detector 70, which again may be of the same type described above in conjunction with FIGS. 2 and 3. An interferogram then appears at the detector 70 as a result of the interference of the test beam and the reference beam.

Reference now should be made to FIG. 5 for another embodiment of an improved extended spatially incoherent laser light source which may be used in conjunction with the various interferometers shown in FIGS. 2, 3 and 4. In the embodiment of FIG. 5, the laser 12 is mounted on a base or frame 19 in a manner similar to the mounting on the base 10 described above in conjunction with FIG. 1. The light beam from the laser 12 illuminates a beam shaping lens 14, much in the same manner as described previously in conjunction with FIG. 1. The lens 14 creates an extended spot of light on a first fixed diffuser 30. This fixed diffuser 30 typically consists of a glass substrate with one diffuse surface. The glass substrate is oriented such that the diffuse side is facing away from the beam shaping lens 14. The light from the diffuser 30 then propagates to a second diffuser, which is placed or cascaded in close proximity to the first diffuser 30.

The second diffuser consists of a circular glass substrate or disk 16 with one diffuse surface. The glass substrate or disk 16 is oriented such that the diffuse side is facing toward the first diffuser 30. The glass substrate or disk 16 is mounted on a shaft of a motor 18, which is operated to rotate the substrate or disk 16 creating a dynamically changing diffuser. The rotation rate required from the assembly shown in FIG. 5 is lower than in the case of a single diffuser, because of the second or input diffuser 30. The light spot on the second diffuser disk 16 acts as an effective source for the subsequent interferometers which may be used in conjunction with it. This embodiment also can equivalently consist of first a rotating diffuser followed by a stationary fixed diffuser.

To use the light source of FIG. 5 in the configurations shown in FIGS. 2, 3 and 4, the multi-mode fiber optic cable 24 shown in these figures is removed. The light source spot on the diffuser disk 16 of FIG. 5 then is employed as the input light for the interferometers of FIGS. 2, 3 and 4. In all other respects, the interferometer systems of FIGS. 2, 3 and 4 operate in the same manner with the light input from the source of FIG. 5 as described previously in conjunction with the manner of operation of these interferometers using the light source from the exit end 28 of the multi-mode fiber optic cable 24. It should be noted that the beam shaping lens 14 also serves to provide the angular divergence of the light scattered by the first and second diffusers 14 and 16 to fully illuminate the collimating lens 34, 50 or 60 of the interferometers illustrated in FIGS. 2, 3 and 4.

The foregoing description of the preferred embodiment of the invention is to be considered as illustrative and not as limiting. Various changes and modifications to the invention will occur to those skilled in the art, to perform substantially the same function, in substantially the same way, to achieve substantially the same result, without departing from the true scope of the invention as defined in the appended claims.

What is claimed is:

1. An extended spatially incoherent light source for use with an interferometer including in combination:
    a laser light source producing a beam of light; and
    first and second cascaded diffusers mounted to receive the beam of light from said laser light source, wherein one of said first and second cascaded diffusers is a dynamically changing diffuser.

2. The combination according to claim 1 further including an interferometer coupled to receive light from said second cascaded diffuser.

3. The combination according to claim 2 wherein said interferometer is a Fizeau interferometer.

4. The combination according to claim 2 wherein said interferometer is a Twyman-Green interferometer.

5. The combination according to claim 2 wherein said interferometer is a Mach-Zehnder interferometer.

6. The combination according to claim 2 wherein said dynamically changing diffuser is a rotating ground glass disk.

7. The combination according to claim 6 wherein one of said first and second cascaded diffusers is a fixed ground glass diffuser.

8. The combination according to claim 7 wherein said fixed ground glass diffuser is said first of said cascaded diffusers and said dynamically changing diffuser is said second of said cascaded diffusers.

9. The combination according to claim 1 wherein one of said first and second cascaded diffusers is a multi-mode optical fiber.

10. The combination according to claim 9 wherein said multi-mode optical fiber is said second diffuser.

11. The combination according to claim 10 wherein said dynamically changing diffuser is a rotating ground glass disk.

12. The combination according to claim 10 wherein said multi-mode optical fiber has an input end and an output end with the input end coupled to receive said beam of light from said first diffuser, and wherein said fiber is configured to a curved path between said input end and the output end thereof.

13. The combination according to claim 12 further including an interferometer coupled to receive light from said second cascaded diffuser.

14. The combination according to claim 13 wherein said laser light source and said first and second cascaded diffusers are mounted on a first base member; and further including an interferometer mounted on a second base member separate from said first base member, and having a light input lens coupled with the output end of said multi-mode optical fiber.

15. The combination according to claim 14 wherein said dynamically changing diffuser is a rotating ground glass disk.

16. The combination according to claim 15 further including a beam shaping lens between said laser light source and said first cascaded diffuser for matching the spot size of said beam of light to said fiber and for matching the divergence of said beam to the acceptance angle of said fiber.

17. The combination according to claim 16 further including an adjustment device coupled with the input end of said multi-mode optical fiber to function as a variable attenuator for light applied to the input of said fiber.

18. The combination according to claim 12 wherein said curved path is a serpentine path.

19. The combination according to claim 1 wherein said dynamically changing diffuser is a rotating ground glass disk.

20. The combination according to claim 19 wherein one of said first and second cascaded diffusers is a multi-mode optical fiber.

21. The combination according to claim 20 wherein said multi-mode optical fiber is said second diffuser.

22. The combination according to claim 21 further including an interferometer coupled to receive light from said second cascaded diffuser.

23. The combination according to claim 21 wherein said laser light source and said first and second cascaded diffusers are mounted on a first base member; and further including an interferometer mounted on a second base member separate from said first base member, and having a light input lens coupled with the output end of said multi-mode optical fiber.

24. The combination according to claim 23 wherein said interferometer is a Fizeau interferometer.

25. The combination according to claim 23 wherein said interferometer is a Twyman-Green interferometer.

26. The combination according to claim 23 wherein said interferometer is a Mach-Zehnder interferometer.

27. The combination according to claim 1 wherein one of said first and second cascaded diffusers is a fixed ground glass diffuser.

28. The combination according to claim 27 wherein said fixed ground glass diffuser is said first of said cascaded diffusers and said dynamically changing diffuser is said second of said cascaded diffusers.

29. The combination according to claim 28 wherein said dynamically changing diffuser is a rotating ground glass disk.

30. The combination according to claim 29 further including an interferometer coupled to receive light from said second cascaded diffuser.

31. The combination according to claim 30 wherein said interferometer is a Twyman-Green interferometer.

32. The combination according to claim 30 wherein said interferometer is a Mach-Zehnder interferometer.

33. The combination according to claim 30 wherein the interferometer is a Fizeau interferometer.

34. The combination according to claim 21 further including a beam shaping lens between said laser light source and said first cascaded diffuser for matching the spot size of said beam of light to said fiber and for matching the divergence of said beam to the acceptance angle of said fiber.

35. The combination according to claim 34 further including an adjustment device coupled with the input end of said multi-mode optical fiber to function as a variable attenuator for light applied to the input of said fiber.

* * * * *